April 24, 1962 L. A. TRUMBLE 3,031,534

METHOD AND APPARATUS FOR EDITING MAGNETIC RECORDINGS

Filed March 11, 1959 2 Sheets-Sheet 1

INVENTOR.
LESLIE A. TRUMBLE
BY
Arthur O. Andersen
ATTORNEY

METHOD AND APPARATUS FOR EDITING MAGNETIC RECORDINGS

Filed March 11, 1959 2 Sheets-Sheet 2

INVENTOR.
LESLIE A. TRUMBLE

BY Arthur O. Andersen

ATTORNEY

3,031,534
METHOD AND APPARATUS FOR EDITING MAGNETIC RECORDINGS

Leslie A. Trumble, La Crosse, Wis.; The La Crosse Trust Company, trustee of said Leslie A. Trumble, deceased Filed Mar. 11, 1959, Ser. No. 798,755
10 Claims. (Cl. 179—100.2)

This invention relates to apparatus for editing magnetic recordings on tape, film or other pliable material.

A primary object of the invention is to edit a recording by removing undesired material and replacing it with correct material without cutting or changing the basic medium upon which the recording was made.

An element of this primary object is to control the editing to such an extent that in cases where there are two, four, or more recorded tracks on a single piece of recording material, such as stereophonic recordings for example, any track desired by be edited without affecting other tracks in any way whatever.

Another element of this primary object is to be able to play corrected material into a tape which has a defect before erasing the defective material, thus giving the editor an opportunity to be certain in advance that the replacement material will be exactly correct before it is actually recorded on the master tape.

A further element of this primary object is to control the editing so closely that a single note in a musical composition can be changed without the change being detectable by an expert.

Another object of this invention is to determine the precise point where a tape should be cut so material can be removed from or added to a single track recording.

In the case of a single-track recording, where it is desired to add more material than can be placed on the original tape, it is an object of this invention to show exactly how much clear tape should be added, and then permit test playing of corrected material before placing new material permanently on the master tape.

Another object of the invention is to indicate precisely where clicks or other unwanted sounds are located on a tape, and to provide means for their removal electronically without erasing other portions of the tape, or for their removal by the actual removal of tape, whichever the editor desires.

Another object of the invention is to provide a machine which, in addition to its primary editing function, can also be used for recording, erasing, or playback in a unique variety of ways which will be disclosed, thus providing in a single machine a convenient method of doing copying and related chores.

Another object of the invention is to provide a machine in which a multiplicity of heads (magnetic recording-playback-erase heads) and tapes may be sychronized and otherwise interrelated mechanically and electrically so that a single machine can do work that now requires two or more machines.

Another object of the invention is to provide an entirely original electrical circuit which simplifies the various steps necessary for editing, and provides the editor with constant checks on changes he may contemplate, before he takes any irretraceable steps.

Other objects and advantages of the invention will become apparent as the specifications proceed to describe the invention with reference to the accompanying drawings in which.

Figure 1:
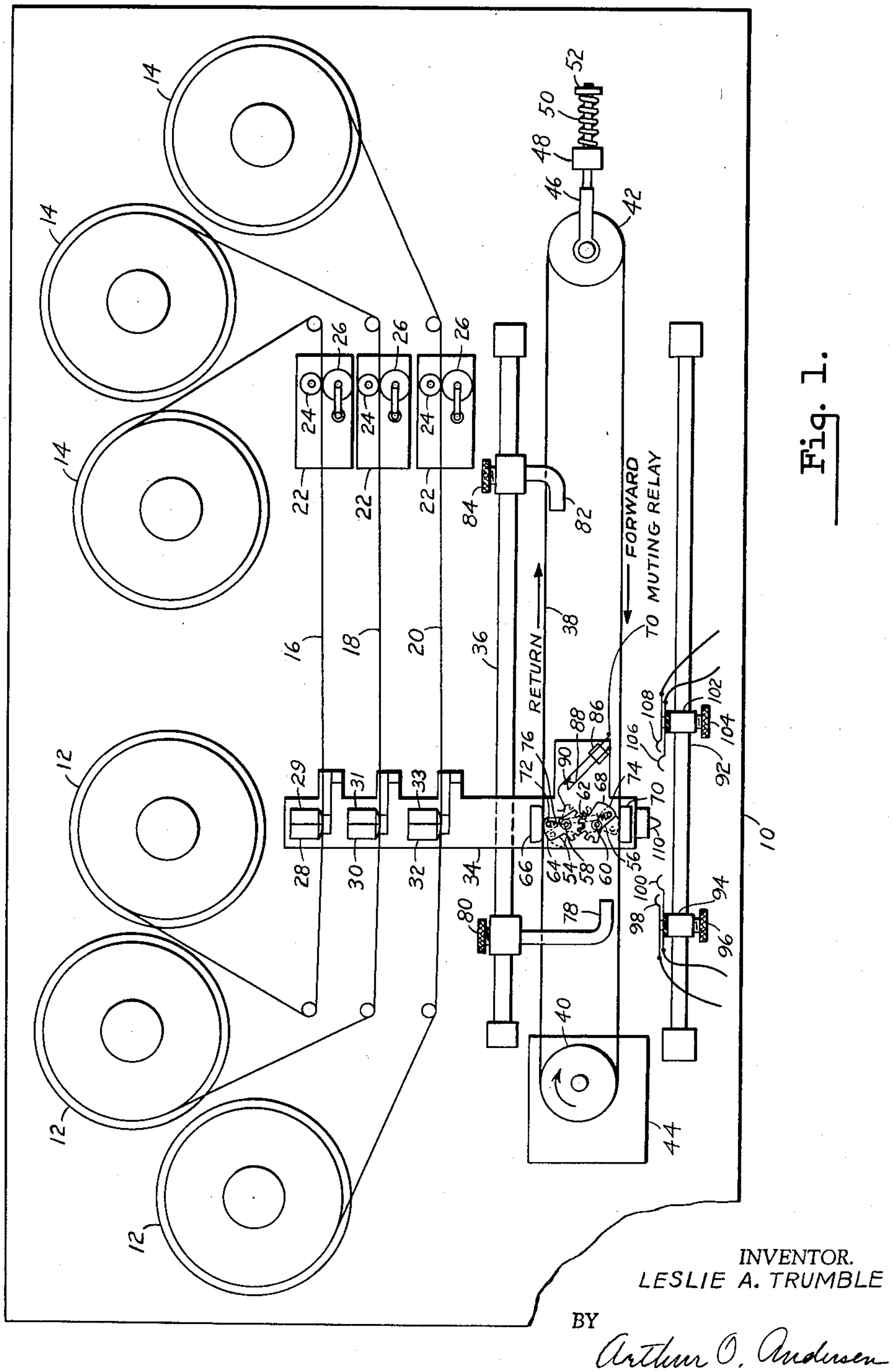
FIG. 1 is a plan view, partly diagrammatic, of the machine of this invention.

Referring to FIG. 1, a base 10 has reels 12 and 14 rotatably mounted thereon. Conventionally motorized reels 12 and 14 support the tapes 16, 18, and 20 for movement from one reel to the other. Tape drives 22 of conventional design are also mounted on the base 10. Each of the tape drives 22 has a driven roll 24 which is driven by a motor (not shown). The tape drives 22 have presser rolls 26 which hold the tapes 16, 18, and 20 in rolling contact with the driver rolls 24. The tapes 16, 18, and 20 pass in sliding contact with magnetic pick-up and recording tape heads 28, 30, and 32 and the tapes also pass in sliding contact with erase heads 29, 31, and 33. The tape heads 28, 30, and 32 are of conventional design and each is capable of two modes of operation, namely, pick-up or playback and recording. These modes of operation are selected by the operator as will be described later in the specification. The tape heads 28, 29, 30, 31, 32, and 33 are mounted on a carriage 34. The carriage 34 is slidably mounted on a square bar 36 which is fixedly mounted on the base 10.

As will be explained in detail below, the carriage 34 may be reciprocated to move the tape heads to scan stationary sound tracts. The term "scanning" is defined as the movement of a sound responsive head along a sound track to play material contained on the track, erase material from the track or record material on the track.

A belt 38 is mounted on a drive roll 40 and an idler roll 42. The drive roll 40 has a drive mechanism 44 mounted on the base 10. The roll 40 is driven in a clockwise direction as viewed in FIG. 1, as indicated by the arrow. The idler roll 42 is rotatably supported on a bracket 46 which is slidably supported in a post 48 extending upwardly from the base 10. A spring 50 acts between this post 48 and an abutment 52 on the bracket 46 to maintain tension in the belt 38.

The belt 38 reciprocates the carriage 34 in a manner which will now be described. The carriage 34 has pinch arms 54 and 56 pivotally mounted thereon at 58 and 60 respectively. Pinch arms 54 and 56 of electrically insulating material are in geared engagement at 62 so that pivotal movement of one pivots the other in the opposite direction. The pinch arm 54 has a portion 64 which engages the belt 38 and holds it against an abutment 66 on the carriage 34 to move the carriage 34 to the right as viewed in FIG. 1. The pinch arm 56 has a portion 68 which engages the belt 38 and holds it against an abutment 70 on the carriage 34 to move the carriage 34 to the left as viewed in FIG. 1. The pinch arms 54 and 56 have pins 72 and 74 respectively. A tension spring 76 has one end secured to the pin 72 and the other end secured to the pin 74. As the arms 54 and 56 pivot from a position in which one pinch arm is in engagement with the belt 38 to the other position in which the other pinch arm is in engagement with the belt 38 the spring is stretched until it passes dead center and its tension then aids the pivotal movement of the pinch arms and holds one of the pinch arms in engagement with the belt 38.

A stop 78 is slidably mounted on bar 36 and held in adjusted position by a screw 80. A second stop 82 is slidably mounted on bar 36 and held in adjusted position by screw 84. Upon movement of carriage 34 to the right, pin 72 is engaged by stop 82 and pinch arms 54 and 56 are rotated to remove belt contact of surface 64 and establish belt contact of surface 68. Contact of surface 68 with the belt 38 causes the carriage 34 to move in the opposite direction to the left until pin 74 contacts the stop 78 and again reverses the direction of the carriage 34. A muting switch 86 having a contact 88 grounded to the carriage 34 and a contact 90 which is opened by pinch arm 54 when the pinch arm 56 pinches the belt for the forward or playback travel of carriage 34 to the left.

The function of muting switch 86 will be described in connection with FIG. 2.

A square bar 92 is mounted on the base 10. A left editing stop 94 is slidably mounted on bar 92 and is held in adjusted position by a screw 96. Contacts 98 and 100 are mounted on, but insulated from stop 94. A right editing stop 102 is slidably mounted on bar 92 and is held in adjusted position by a screw 104. Contacts 106 and 108 are mounted on, but insulated from stop 94. A right editing stop 102 is slidably mounted on bar 92 and is held in adjusted position by a screw 104. Contacts 106 and 108 are mounted on, but insulated from stop 102. A grounded contact 110 is mounted on the carriage 34 and in its travels engages contacts 98, 100, 106 and 108. Contacts 98 and 106 are pick-up and record contacts respectively and are spaced from erase contacts 100 and 108 respectively a distance precisely equal to the distance between the pick-up-record portion of the head 28 and the erase portion of the head 29. The operative portions of the heads 30 and 31 and the operative portions of the heads 32 and 33 are spaced a distance equal to that in the case of heads 28 and 29. The function of the last mentioned contacts will be described in detail with reference to FIG. 2.

Figures 2, 3:
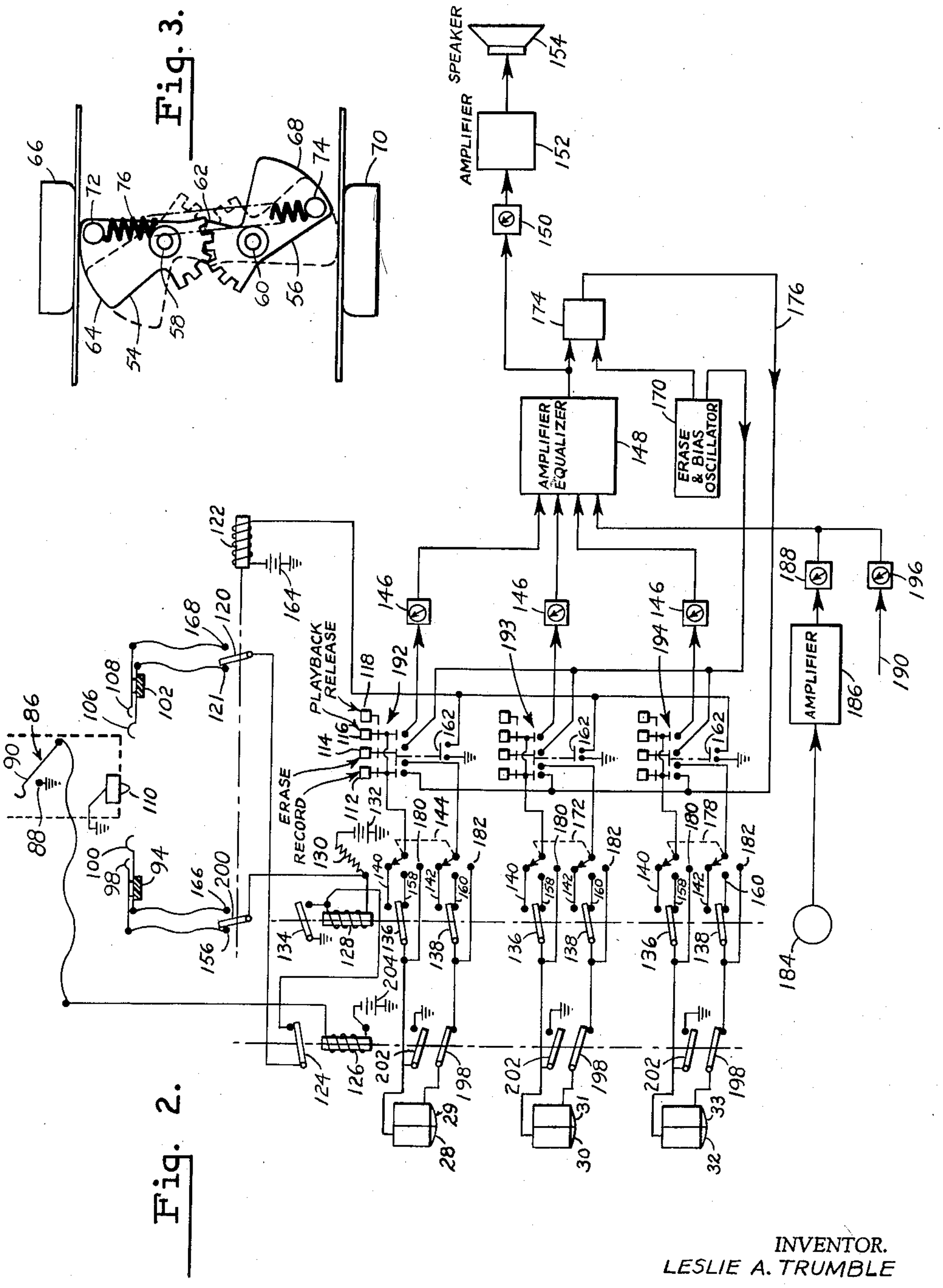
FIG. 2 is a diagram of the electrical circuit of the machine.
FIG. 3 is an enlarged plan view of the reversing mechanism.

FIG. 2 is a diagrammatic view of the electrical circuit for the apparatus for editing magnetic recordings. Amplifiers, equalizers, oscillators, mixers, meters, speakers are standard equipment regularly used in connection with magnetic tape apparatus and details of these elements are not a part of this invention. The electrical circuit for the return muting relay 126, the editing relay 128, the erase relay 122, the dual selector switches 122, 172, 178, and the mode controls 192, 193, 194 are part of this invention.

Inasmuch as the circuits for mode control of each pair of heads are similar, like reference numerals are used and a description of one circuit will suffice.

Push button switches 112, 114, 116 and 118 on mode controls 192, 193 and 194 are for record, erase, playback and release respectively.

*Pick-Up or Playback*

Let it be assumed that button 116 on mode control 192 has been depressed for playback. Let it also be assumed that the carriage 34 is starting a forward playback movement to the left in FIG. 1. Grounded contact 110 engages contact 108 which is an open circuit at this instant, then engages contact 106 which now is associated with contact 121 of erase relay 122. Movable contact arm 120 of relay 122 is against contact 121 because erase relay 122 is not energized. This carries the ground of contact pin 110 to switch arm 124 of muting relay 126. Normally closed contact 124 is also closed because muting relay 126 is not energized when muting switch contact 90 is open. Therefore editing relay 128 is momentarily energized through resistor 130 from a source of potential 132. With relay 128 energized, normally open contact 134 will close providing a connection to ground to maintain relay 128 energized after contact 110 on carriage 34 moves off contact 106. Energization of relay 128 will move contacts 136 and 138 to connections 140 and 142 respectively. Hand operated dual selector switch 144 is in the position shown in FIG. 2, that is, in contact with connection 140, which is known as the editing position. In this position a portion of tape 16 may be played back: Sound picked up from tape 16 by head 28 goes through contact arm 136, connection 140, switch 144, switch 116, volume control 146, amplifier-equalizer 148, volume control 150, and monitor amplifier 152 to speaker 154.

When ground contact 110 engages contact 98 after passing over open-circuit contact 100, connection is made through contact 156, contact arm 200 of relay 122, and resistance 130. Editing relay 128 is therefore shorted out from source of potential 132. De-energization of relay 128 permits contact 136 to move away from connection 140 and playback ceases. It is thus seen that pick-up or playback is between contact 106 and 98.

The stops 94 and 102 may be adjusted until only the defective portion of a tape is played back, and the stops 78 and 82 may be adjusted on the bar 36 so that the defective portion of the tape 16 is approximately centered in the path of travel of the carriage 34 and so that there is some travel of the carriage 34 beyond both ends of the defective portion. The relationship between these two sets of controls will be described in the paragraphs covering operation of the apparatus.

*Erase*

With a defective portion of tape isolated between stops 94 and 102, the defective portion may be either muted or actually erased. In normal use the defective portion will not be erased until the replacement portion of another tape is set in position.

To erase the defective portion, the erase switch 114 of mode control 192 is depressed. This closes ground contact 162 to energize erase relay 122 from source of potential 164. Contact arms 120 and 158 are therefore moved to contacts 166 and 168 so that erase contacts 100 and 108 replace pick-up or playback contacts 98 and 106 in the circuit. Therefore contact 138 will be on connection 142 during forward passage of the erase portion of the head 29 over the defective portion of the tape. Erase head 29 is connected through contact arm 138, connection 142, switch 144, switch 114, to the erase and bias oscillator 170. And since erase contacts 100 and 108 reposition the tape head so the erase head occupies the space formerly covered by the record-playback head in the tape head, it is thus seen that the defective portion of the tape is erased.

*Adjacent Edit Operation*

Playback of only the portion of tape adjacent to a defective area, with the defective area muted, is required in connection with the normal editing cycle. This is called an adjacent edit operation. For this operation the dual selector switch 144 is moved to make contact with connectors 158 and 160. Relay 128 is de-energized during the travel of contact 110 outside of the space between contacts 98 and 106, and therefore contact arm 136 will be on connector 158 during this portion of the travel to connect head 28 through contact arm 136, connector 158 to switch 144. With playback switch 116 of mode control 192 depressed, playback will occur as there is connection from head 28, contact 136, connector 158, switch 144, switch 116, volume control 146, amplifier-equalizer 148, volume control 150 and monitor amplifier 152 to speaker 154.

*Record*

When it is desired to record with head 28 on tape 16, the record switch of mode control 192 is pushed down and the dual selector switch 144 is placed in contact with connectors 140 and 142. Assuming that the material to be recorded is on tape 18, the playback switch 116 of mode control 193 is pushed down. The dual selector switch 172 for head 30 is placed in contact with connectors 140 and 142 so that the signal passes to amplifier-equalizer 148. The signal then passes through the mixer 174 thence through line 176 to the record switch of the head 28. From switch 112 the signal passes through connector 140, contact 136 to the record portion of the head 28 to record the signal on the tape 16. If it is desired to record material from tape 20 as well as from tape 18, the playback switch 116 of mode control 194 is also pushed down and the selector switch 178 for head 32 is placed in contact with connectors 140 and 142. It is thus seen that material from the tape 20 as well as material from the tape 18 will simultaneously record on the tape 16.

Dual selector switches 144, 172, and 178 have a third position, called normal, in which contact is made with connectors 180 and 182 to provide record, pick-up or playback, or erase of all the tape between the stops 78 and 62. Let us assume that the switch 144 is placed to contact connectors 180 and 182. The editing relay 128 is by-passed and head 28 may be connected through connector 180 to record switch 112 or playback switch 116, if either is depressed. Head 29 may also be connected through connector 182 for erase action through switch 114 provided this switch is activated. This erase connection is also independent of editing relay 128.

The normal position of the selector switch 144 may be used for continuous recording, erasing, and playback using the tape drive 22, in which case head carriage 34 remains stationary and the tape is moved over the head in the conventional manner.

In this normal position of the selector switch 144 an original recording may be made from the microphone 184 through its amplifier 186 and the volume control 188. Recordings may also be made from other program material, using utility source 190 through volume control 196.

*Return Muting Relay*

The return muting relay 126 is provided to prevent functioning of any of the modes of operation—record, playback, or erase—during return travel of carriage 34 to the right. On return travel of carriage 34 the switch 90 is closed as described above and the muting relay 126 is energized from the source of potential 204. Contacts 202 are therefore closed and contacts 198 are open. With contacts 202 closed any signal to or from the pickup or playback heads 28, 30 and 32 is grounded. Open contacts 198 cut off any signal to or from the erase portions of heads 29, 31 and 33.

Various methods of operating the apparatus will now be described.

*Editing a Tape Recording*

Assume a word is mispronounced on a master tape recording of voice against musical background. Editing problem: Replace the word without redoing the entire sequence.

On a separate tape, using conventional methods, the sentence requiring editing is properly rerecorded. This is called the patch tape.

Similarly, on another tape, selected music as used on the master tape is recorded without voice. This is the background tape.

Consider the master tape to be 16 in FIG. 1, associated with tape heads 28 and 29. Consider the patch tape to be 18, associated with tape heads 30 and 31. Consider the background tape to be 20, associated with tape heads 32 and 33.

This sequence is purely optional, since all three circuits are operatively identical.

With tape head carriage 34 stationary, and tape drive 22 for heads 28 and 29 turned on, master tape 16 will playback in conventional manner. Dual selector switch 144 must be set in its third, or normal, position making contact with connectors 180 and 182. Playback button 116 of mode control 192 must be depressed.

Master tape 16 is now played back in a conventional manner until the approximate area containing the error is located. It is then turned off.

Similarly, the patch tape 18 on heads 30 and 31 is played until the desired portion is approximately centered near the heads. And background tape 20 is given a similar rough adjustment.

Now with all tape drives turned off, tape head carriage 34 is made to shuttle back and forth between adjustable stops 78 and 82.

With circuits associated with head 28 set for playback as before, but with the other two circuits turned off by depressing release button 118 on mode controls 193 and 194, the word requiring editing is centered between stops 78 and 82. Using adjustment screws 80 and 84, these stops are set so that two or three words on each side of the word to be edited will be included in the section of tape over which head 28 is passing.

Since the tape head carriage 34 is reciprocating, this selected section of tape is now being played over and over.

Dual selector switch 144 is now turned to its editing position, contacting connectors 140 and 142. In this position only the portion of the tape in the editing area between editing stops 94 and 102 will be played back, although the tape head carriage 34 will continue to travel the full distance between carriage stops 78 and 82.

Editing stops 94 and 102 are now carefully adjusted so that only the word to be edited and its background music can be heard.

Now dual selector switch 144 is moved to its middle or adjacent editing position contacting connectors 158 and 160. In this position all sound in the editing area is muted but not erased, and all sound within the operating range of head 28 is played back except for the muted section.

The circuit associated with tape head 30 is now activated by depressing playback button 116 on mode control 193, and by placing dual selector switch 172 in its top or edit position, contacting connectors 140 and 142.

Patch tape 18 and master tape 116 are both in playback mode, with master tape 16 muting the word that needs editing, and patch tape 18 set to mute all material on either side of the word that is to be patched into the master tape. Patch tape 18 is now carefully adjusted so it will play the correction word into the muted section of the master tape. Volume controls 146 associated with each circuit are adjusted so the two tapes play as one.

Circuits associated with head 32 are now similarly activated so the music from background tape 22 can be synchronized into the muted area of the master tape and adjusted for tone and volume.

After all adjustments are satisfactory, dual selector switch 144 is changed to the edit position on connectors 140 and 142 and changed to the erase mode by first pressing release button 118 of mode control 192, and then pressing erase button 114. This erases the incorrect word that was previously just muted.

Next the erase button is released, and the record button 112 depressed for one complete forward trip of tape head carriage 34, thus permanently recording the corrected word and background on the master tape.

If changes to be made require more tape or less tape than the original, the process is similar, except that when the necessary amount of tape required is determined from the patch tape, the master tape is cut and adjusted accordingly.

If only clicks are to be removed, patch and background tapes are normally not required, but otherwise the procedure is similar.

*Recording Sound-On-Sound*

If cues, music or sound effects of any sort are to be added to a master tape, the sound desired is recorded on a separate tape. This tape may be synchronized with the master as already described, and then recorded on the master over existing material if desired.

If sound is only wanted temporarily, the two tapes, once synchronized, may be played back together, thus simulating the effect of sound-on-sound without actually modifying the master tape in any way.

*Copying*

With a master tape on any of the heads, set for playback, and with tapes on either or both the other heads set for recording, and with the mode controls set for normal, copies of the original tape may be made.

Since each tape head has its own circuits and its own tape drive, copies can be made at any speed desired within the limits of the machine.

*General*

In any of the operations described, where it is desired to use outside program material or live sound of any sort, the microphone circuit 184 and/or the utility circuit 190 may be used to feed any of the three circuits shown.

The fact that only three circuits are shown in the drawings does not indicate a limit of the circuits that may be required for some applications of the apparatus.

Also, although separate heads have been disclosed for erase and for playback and record, a combination head having all of these functions can be used if desired or separate heads can be used for each function.

Although I have disclosed a specific embodiment of my invention, I contemplate that various changes may be made without departing from the scope of my invention, and I desire to be limited only by the claims.

I claim:

1. In a machine for editing a sound record having a sound track, a base, a carriage, separate sound responsive means on said carriage for scanning a plurality of sound tracks, means mounting said carriage for translatory movement on said base, an endless belt, means on said base for supporting and driving said endless belt, means on said carriage for alternately grasping one or the other of the reaches of said belt for reciprocating said carriage and stops adjustably mounted relative to said carriage for actuating said last mentioned means to determine the limits of travel of said carriage.

2. In a machine for editing a sound track, a carriage mounted for reciprocating movement, pick up heads mounted on said carriage each of said pick up heads being adapted to scan a separate sound track, means for reciprocating said carriage to move said heads in relative scanning movement with respect to the sound tracks, electrical circuits for using impulses from said pickup heads for playback and record, and means for activating said electrical circuits during equal lengths of movement of said carriage whereby an exact portion of one track can be transferred with precision to the other track.

3. In a machine for editing a sound track, a base, a carriage mounted for reciprocating movement on said base, pick up heads mounted on said carriage each of said pick up heads being adapted to scan a separate sound track, a drive on said base, means on said carriage for connecting and disconnecting said carriage to said drive, stops adjustably mounted on said base for actuating said last named means, electrical circuits for using impulses from said pickup heads for play-back, and means for deactivating said electrical circuits during movement of said carriage in one direction, whereby playback is obtained during movement of said carriage in one direction only.

4. In a machine for editing a sound track, a carriage mounted for reciprocating movement, a pick-up head on said carriage adapted to scan a first sound track, a record head on said carriage adapted to scan a second sound track, means for reciprocating said carriage to move said heads in relative scanning movement with respect to the sound tracks, electrical circuits for conducting impulses from said pick up head to said record head, and means for activating said electrical circuits during movement of said carriage in one direction only whereby pick-up and record functions are obtained during movement of said carriage in one direction only.

5. In a machine for editing a sound track, a carriage mounted for reciprocating movement, a pick-up head and an erase head on said carriage adapted to scan a sound track, means for reciprocating said carriage to move said heads in relative scanning movement with respect to the sound track, a first electrical circuit for using impulses from said pick-up head for playback, a second electrical circuit for operating said erase head, and means for activating said electrical circuits during equal lengths of movement of said carriage in one direction only.

6. In a machine for editing a sound track, a carriage mounted for reciprocating movement, sound pick up heads mounted on said carriage, each of said pick up heads being adapted to scan a separate sound track, means for reciprocating said carriage to move said heads in relative scanning movement with respect to said sound tracks, electrical circuit means for using impulses from said sound tracks for playback, means for deactivating said electrical circuit means during travel of said carriage in one direction and adjustable means for deactivating said electrical circuit means during selected portions of the travel of said carriage in the opposite direction.

7. In a machine for editing a sound track, a carriage mounted for reciprocating movement, sound pick up heads mounted on said carriage, each of said pick up heads being adapted to scan a separate sound track, means for reciprocating said carriage to move said heads in relative scanning movement with respect to said sound tracks, means adjustable with respect to said carriage for determining the extent of reciprocating movement of said carriage, electrical circuit means for using impulses from said sound tracks for playback, means for deactivating said electrical circuit means during travel of said carriage in one direction and adjustable means for deactivating said electrical circuit means during selected portions of the travel of said carriage in the opposite direction.

8. In a machine for editing a sound track, a carriage mounted for reciprocating movement, a pick up head on said carriage adapted to scan a first sound track, a record head on said carriage adapted to scan a second sound track, means for reciprocating said carriage to move said heads in relative scanning movement with respect to said sound tracks, electrical circuit means for conducting impulses from said pick up head to said record head and means for deactivating said electrical circuit means during travel of said carriage in one direction and adjustable means for deactivating said electrical circuit means during selected portions of the travel of said carriage in the opposite direction.

9. In a machine for editing a sound record having a sound track, a carriage, means for reciprocating said carriage, an erase head on said carriage and adapted to scan a first sound track, a first pick up head on said carriage adapted to scan the first sound track, a second pick up head on said carriage and adapted to scan a second sound track, a first electric circuit for utilizing impulses from said first pick up head to actuate a sound reproducer, a second electric circuit for utilizing impulses from said second pick up head to actuate a sound reproducer, and a third electric circuit for energizing said erase head.

10. Method of editing a master tape recording comprising recording replacement sound on a patch tape, locating the master tape and the patch tape with respect to a carriage having pick up and erase heads so that the sound of one tape approximately coincides with the other, traversing the carriage over the master tape and adjusting the extent of reproduction to reproduce only the sound to be replaced, traversing the carriage to reproduce from the master tape a portion of the sound on either side of the sound to be replaced while reproducing approximately the replacement sound on the patch tape, adjusting the patch tape until the replacement sound accurately coincides with the sound to be replaced, traversing the carriage to move an erase head over the master tape to erase the sound to be replaced, and traversing the carriage to move a pick up head over the patch tape to reproduce the replacement sound and to move a pick up head over the master tape to record the replacement sounds on the master tape.

References Cited in the file of this patent

UNITED STATES PATENTS 2,606,092 Rich ------------------ Aug. 5, 1952

(Other references on following page)

UNITED STATES PATENTS

| | | |
|---|---|---|
| 2,626,979 | Woods | Jan. 27, 1953 |
| 2,647,168 | Rivas | July 28, 1953 |
| 2,675,430 | Clarke | Apr. 13, 1954 |
| 2,764,639 | Holt | Sept. 25, 1956 |
| 2,804,499 | Butts | Aug. 27, 1957 |
| 2,816,177 | Logan | Dec. 10, 1957 |
| 2,822,426 | Dinsmore | Feb. 4, 1958 |
| 2,831,069 | Snow | Apr. 15, 1958 |
| 2,852,762 | MacDonald | Sept. 16, 1958 |
| 2,876,561 | Horne | Mar. 10, 1959 |